United States Patent

Taomoto et al.

(10) Patent No.: US 7,351,443 B2
(45) Date of Patent: Apr. 1, 2008

(54) ELECTRON-EMMITING MATERIAL AND MANUFACTURING METHOD THEREFOR

(75) Inventors: Akira Taomoto, Kyotanabe (JP); Toyokazu Ozaki, Nara (JP); Masahiro Deguchi, Hirakata (JP); Motoshi Shibata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/134,327

(22) Filed: May 23, 2005

(65) Prior Publication Data

US 2005/0206293 A1 Sep. 22, 2005

Related U.S. Application Data

(63) Continuation of application No. PCT/JP2004/008006, filed on Jun. 2, 2004.

(30) Foreign Application Priority Data

Jun. 2, 2003 (JP) .............................. 2003-156400

(51) Int. Cl.
*B05D 5/12* (2006.01)
(52) U.S. Cl. ..................... 427/77; 427/373; 427/374.2; 427/380; 427/404; 427/202; 427/205
(58) Field of Classification Search .................. 427/77, 427/202, 205, 373, 374.2, 380, 404
See application file for complete search history.

(56) References Cited

U.S. PATENT DOCUMENTS

| 4,915,984 | A | * | 4/1990 | Murakami | .................. 427/113 |
|---|---|---|---|---|---|
| 5,443,859 | A | * | 8/1995 | Nagata | ........................ 427/122 |
| 5,840,774 | A | * | 11/1998 | Ehrlich et al. | ................. 521/61 |
| 6,008,569 | A | * | 12/1999 | Yamanobe | ................... 313/310 |
| 6,737,792 | B2 | * | 5/2004 | Saito et al. | .................. 313/310 |
| 6,914,372 | B1 | * | 7/2005 | Akiyama et al. | ........... 313/309 |
| 2002/0031972 | A1 | * | 3/2002 | Kitamura et al. | ............... 445/3 |
| 2002/0141932 | A1 | * | 10/2002 | Klett et al. | ............. 423/445 R |
| 2002/0171357 | A1 | * | 11/2002 | Sun et al. | .................... 313/491 |
| 2003/0039830 | A1 | * | 2/2003 | Takeda et al. | .............. 428/364 |

(Continued)

FOREIGN PATENT DOCUMENTS

JP 62091414 * 2/1987

(Continued)

OTHER PUBLICATIONS

Sun, Z., et al. "Field emission from polymer-converted carbon films by ultraviolet radiation." Applied Physics Letters, American Institute of Physics, Apr. 2, 2001, vol. 78, No. 14, pp. 2009-2011.

*Primary Examiner*—Timothy Meeks
*Assistant Examiner*—Jimmy Lin
(74) *Attorney, Agent, or Firm*—McDermott Will & Emery LLP (57) ABSTRACT

The present invention provides an emissive material with excellent electron emission characteristics. In particular, the present invention relates to a method for manufacturing an emissive material consisting of oriented graphite, having a step of obtaining an oriented graphite comprising a second component and having pores on the inside by heat treating a polymer film in the presence of a second, non-carbon component.

19 Claims, 6 Drawing Sheets

U.S. PATENT DOCUMENTS

2004/0063839 A1* 4/2004 Kawate et al. .............. 524/439

FOREIGN PATENT DOCUMENTS

| JP | 4-84600 A | 3/1992 |
| JP | 10-188778 A | 7/1998 |
| JP | 11100207 A * | 4/1999 |
| JP | 2000-44220 A | 2/2000 |
| JP | 2002-100278 A | 4/2002 |
| JP | 2003-223843 A | 8/2003 |
| JP | 2003223843 A * | 8/2003 |
| JP | 2004269319 A * | 9/2004 |
| WO | WO 01-27963 * | 4/2001 |

* cited by examiner

ELECTRON-EMMITING MATERIAL AND MANUFACTURING METHOD THEREFOR

REFERENCE TO RELATED APPLICATION

This application is a continuation of International Application No. PCT/JP2004/008006, whose international filing date is Jun. 2, 2004, which in turn claims the benefit of Japanese Application No. 2003-156400 filed on Jun. 2, 2003, the disclosures of which Applications are incorporated by reference herein. The benefit of the filing and priority dates of the International and Japanese Applications is respectfully requested.

TECHNICAL FIELD

The present invention relates to an electron-emitting material and a manufacturing method therefor. More particularly, the present invention relates to a method for manufacturing an oriented graphite comprising a metal element and having pores inside.

BACKGROUND ART

Graphite made of carbon is extremely important as an industrial material because of its extraordinary heat resistance and chemical resistance, and because it is highly electrically conductive and heat conductive. Although natural graphite is also used, industrially manufactured graphite is the most common.

For example, a method which is used industrially is to manufacture sheets of graphite by baking treatment of a polyimide or other aromatic polymer which is used as the starting raw material (Japanese Unexamined Patent Publication No. H4-84600). Applications for this artificial graphite include for example optical parts for x-rays, high-heat conduction sheets, diaphragms with excellent high-frequency characteristics and the like.

Efforts have been made in recent years to use carbon materials as emissive materials, and research has been directed at improving the electron emission characteristics thereof. A method which has been proposed using shape is one which employs pointed shapes such as carbon nanotubes. Methods in which the surface condition is altered include efforts to improve the electron emission characteristics by decreasing the work function.

A method which is known for decreasing work function is to cover the surface of a carbon formed around a core of fine metal particles with an alkaline metal or alkaline earth metal (Japanese Unexamined Patent Publication No. H10-188778).

In addition, in order for a carbon material to be used as a heat-conduction sheet or the like it must have such characteristics as flexibility, strength and the like. To this end it is necessary to control the foaming condition (porosity). One known method for manufacturing such a graphite sheet is a method for manufacturing a graphite sheet which is flexible, elastic and sufficiently thick by adding an inorganic or organic filler to the aromatic film which is the raw material and treating them at high temperature to achieve a uniform foaming condition (Japanese Unexamined Patent Publication No. 2000-44220).

Thus, efforts have been made to apply artificially-made graphite to a variety of uses, and it has been found that forming pores inside graphite while also introducing suitable metals therein is an effective means for further improving the flexibility, electron emission characteristics and the like of graphite material.

In contrast, the method disclosed in Japanese Unexamined Patent Publication No. H4-84600 is a method for manufacturing a graphite diaphragm by pressure molding at temperatures of 2000° C. or more in the step of heat treating a polymer film. In this method, however, there is no foaming, and the inside of the graphite cannot be provided with pores. Consequently, it is difficult to manufacture an oriented graphite with superior electron emission characteristics, flexibility, toughness and the like.

On the other hand, the method disclosed in Japanese Patent Laid-open Publication No. H10-188778 is a method of improving the electron emission characteristics by covering the surface of a carbon formed around a core of fine metal particles with an alkaline metal or alkaline earth metal in order to change the surface condition. In this method, however, the electron emission characteristics are improved by altering the surface condition. That is, this method is limited in its ability to improve the electron transmission characteristics because it does not form pores inside the graphite.

In the method disclosed in Japanese Unexamined Patent Publication No. 2000-44220, on the other hand, a situation was studied in which 3% by weight calcium stearate and 5% by weight calcium hydrogenphosphate were included in a baking raw material comprising filler with the aim of creating a uniform foaming condition by heat treating at high temperatures with the addition of an inorganic or organic filler to a raw material aromatic film. In order to control the foaming condition it is important to investigate amounts and types of filler. However, in this method metal elements were not investigated as filler, and improvement due to the catalytic effect of metal elements cannot be expected.

As described above, because it is difficult to control the foaming condition with conventional methods it is also difficult to provide the desired pores in the interior of the graphite.

DISCLOSURE OF THE INVENTION

Consequently, it is an object of the present invention to provide an electron-emitting material with improved electron emission characteristics by providing the graphite with the desired pores.

The inventors perfected the present invention when they discovered that the object could be achieved by heat treatment under specific conditions using a polymer material as the raw material.

The present invention relates to the following emissive material and manufacturing method therefor.

1. A method for manufacturing an electron-emitting material consisting of oriented graphite, the method comprising a step of heat-treating a polymer film with a particulate component, as a second component other than carbon, arranged on the surface of the polymer film to obtain an oriented graphite with a density of no less than 0.60 g/cm$^3$ and no more than 2.00 g/cm$^3$ which comprises the second component and has pores inside.

2. The manufacturing method according to 1 above, wherein the second component is arranged on the surface of the polymer film by sprinkling the second component in the solid state on the surface.

3. The manufacturing method according to 1 above, wherein the second component is arranged on the surface of the polymer film by coating the polymer film with a solution or dispersion of the second component.

4. The manufacturing method according to 1 above, wherein all or part of the second component is introduced during heat treatment.

5. The manufacturing method according to 1 above, wherein the thickness of the polymer film is no less than 10 μm and no more than 200 μm.

6. The manufacturing method according to 1 above, wherein the polymer film is at least one of polyamide, polyimide, polyphenylene terephthalamide, polyphenylene oxadiazole, polybenzothiazole, polybenzobisthiazole, polyphenylene benzoimidazole, polyphenylene benzobisimidazole, polythiazole, polyparaphenylenevinylene, polyamidimide and polyacrylonitrile.

7. The manufacturing method according to 1 above, wherein heat treatment is performed in the temperature range of no less than 400° C. and no more than 3200° C.

8. The manufacturing method according to 1 above, wherein heat treatment comprises a first heat treatment performed in the temperature range of 400° C. or more and less than 1400° C., and a second heat treatment performed in the temperature range of no less than 1400° C. and no more than 3200° C. after the first heat treatment.

9. The manufacturing method according to 8 above, wherein the second component is arranged on the surface of the polymer film between the first heat treatment and the second heat treatment.

10. The manufacturing method according to 8 above, wherein the first heat treatment is followed by cooling to 30° C. or less, and followed by the second heat treatment.

11. The manufacturing method according to 8 above, wherein the heating rate in the first heat treatment and/or second heat treatment is 10° C./minute or less.

12. The manufacturing method according to 10 above, wherein the cooling rate after the first heat treatment and/or the cooling rate after the second heat treatment is 10° C./minute or less.

13. The manufacturing method according to 1 above, wherein the second component is 10 ppm or more by weight and 10% or less by weight of the resulting oriented graphite.

14. The manufacturing method according to 1 above, wherein the second component is at least one metal element.

15. The manufacturing method according to 1 above, wherein the second component is at least one selected from the group consisting of Ni, Cr, Fe, Pd, Ir, Pt, P, Ca, Si, Al and Mg.

16. The manufacturing method according to 1 above, wherein the mean particle size of the particulate component is no less than 1 μm and no more than 50 μm.

17. The manufacturing method according to 1 above, wherein the oriented graphite consists of a layered body formed by layering of graphenes having a hexagonal carbon structure so as to appear to be stacked in a wavy pattern.

18. The manufacturing method according to 1 above, wherein the crystallite size in the c-axial direction in the oriented graphite is 10 nm or more.

19. The manufacturing method according to 1 above, wherein the pore size in the oriented graphite is no less than 10 nm and no more than 10 μm.

20. An electron-emitting material consisting of oriented graphite, wherein the electron-emitting material 1) comprises a second component other than carbon and has pores inside and 2) has a density of no less than 0.60 g/cm³ and no more than 2.00 g/cm³.

21. The electron-emitting material according to 19 above, wherein no less than 10 ppm by weight and no more than 10% by weight of the second component is contained in the oriented graphite.

22. The electron-emitting material according to 20 above, wherein the second component is at least one metal element.

23. The electron-emitting material according to 20 above, wherein the second component is at least one selected from the group consisting of Ni, Cr, Fe, Pd, Ir, Pt, P, Ca, Si, Al and Mg.

24. The electron-emitting material according to 20 above, wherein the oriented graphite consists of a layered body formed by layering of graphenes having a hexagonal carbon structure so as to appear to be stacked in a wavy pattern.

25. The electron-emitting material according to 20 above, wherein the crystallite size in the c-axial direction in the oriented graphite is 10 nm or more.

26. The electron-emitting material according to 20 above, wherein the pore size in the oriented graphite is no less than 10 nm and no more than 10 μm.

27. An electron-emitting element having at least an electron-emitting layer, a control electrode layer and an insulating layer on a base, the electron-emitting layer and the control electrode layer being arranged with the insulating layer therebetween, wherein the electron-emitting layer is the electron-emitting material according to 20 above.

LIST OF ELEMENTS

80: Electron-emitting element
81: Substrate
82: Electrode layer
83: Electron-emitting layer
84: Control electrode layer
85: Insulator layer
86: Control power
87: Protruding portion
88: Space region

BEST MODE FOR CARRYING OUT THE INVENTION

1. Method for Manufacturing Electron-Emitting Material

The method for manufacturing an electron-emitting material of the present invention is method for manufacturing an electron-emitting material consisting of oriented graphite, the method comprising a step of heat-treating a polymer film with a particulate component, as a second component other than carbon, arranged on the surface of the polymer film to obtain an oriented graphite with a density of no less than 0.60 g/cm³ and no more than 2.00 g/cm³ which comprises the second component and has pores inside.

Polymer Film

There are no particular limits on the form of the polymer film, which can be determined appropriately normally within the range of 200 µm or less according to the material properties, method of use and the like. No less than 20 µm and no more than 125 µm is particularly desirable.

There are no limits on the material of the polymer film as long as it produces graphite when heat treated. In particular, from the standpoint of ease of production of graphite by heat treatment, at least one of polyamide, polyimide, polyphenylene terephthalamide, polyphenylene oxadiazole, polybenzothiazole, polybenzobisthiazole, polyphenylene benzoimidazole, polyphenylene benzobisimidazole, polythiazole, polyparaphenylenevinylene, polyamidimide and polyacrylonitrile is desirable.

One or two or more sheets of the polymer film can be used. When two or more sheets are used, they can be used with one film layered on another. In this case, heat treatment can be performed with the second component between the layers.

Second Component

The second component can be selected appropriately from the elements other than carbon (metal elements and the like) according to the desired material properties and the like. For example, at least one of Ni, Co, Fe, Pd, Ir and Pt for example will form a compound because it is highly reactive with carbon and enhance activity because it is highly catalytic, thus allowing the various characteristics to be greatly improved. Alternatively, at least one of P, Ca, Si, Al and Mg for example will melt in the heat treatment step and spread across the entire layered surface of the graphite, making it easier for the element other than carbon to be discharged outside the film when the raw material polymer film is carbonized and graphitized, and allowing the foaming condition to be controlled and pore regions to be formed within the graphite.

The second component can be included in the reaction system in such a way that it is introduced into the oriented graphite. Moreover, the second component may be provided in a form of solid state or liquid state as long as it is introduced into the oriented graphite. In the case of a solid state, for example particles of the second component can be placed on the polymer film and heat treated. In the case of a liquid staye, for example a solution or dispersion of the second component can be coated on the polymer film and then heat treated.

The source of the second component can be either the second component itself or a compound, alloy, intermetallic compound or the like comprising the second component.

The amount of the second component used can be determined appropriately according to the characteristics of the target emissive material, the type of second component and the like. In general, it may be prepared to no less than 10 ppm by weight and no more than 10% by weight or especially no less than 100 ppm by weight and no more than 2% by weight of the resulting oriented graphite or in other words of the total of the graphite and second component (same below).

Heat Treatment

In the present invention, the polymer film is heat treated with the second component present. The second component may be present before heat treatment, or part or all of the second component may be introduced during heat treatment. When heat treating with the second component present, the second component (metal element or the like) affects the carbonization/graphitization reaction of the polymer film. That is, it is possible to achieve the desired foaming condition and impart pores to the interior of the graphite. As a result, the electron emission characteristics are improved due to the presence of the second component inside the oriented graphite. In particular, when all or part of the second component (particularly metal particles) is introduced in the heat treatment step, because the second component can be reacted at a specific reaction temperature it is possible to achieve an efficient reaction with a small amount of the second component. It is also possible to achieve an efficient reaction by including the second component with the polymer film to begin with.

The conditions for heat treatment can be changed appropriately according to the type of polymer film used, the type of second component and the like so as to produce a graphite from polymer film.

The heat treatment temperature can be normally set within the temperature range of no less than 400° C. and no more than 3200° C.

In particular, it is desirable to first perform a first heat treatment in the temperature range of no less than 400° C. and less than 1400° C. (especially no less than 1000° C. and no more than 1300° C.), and then perform a second heat treatment in the temperature range of no less than 1400° C. and no more than 3200° C. (especially no less than 2500° C. and no more than 2900° C.). In the case, it is desirable that the first heat treatment be followed by cooling to 30° C. or less (particularly no less than 5° C. and no more than 30° C.), followed by the second heat treatment.

There are no particular limits on the heating rate for the first heat treatment and/or second heat treatment, but in general a rate of 10° C./minute or less, or particularly no less than 2° C./minute and no more than 10° C./minute, or more particularly no less than 3° C./minute and no more than 10° C./minute is desirable.

Moreover, there are no particular limits on the cooling rate for the first heat treatment and/or the cooling rate for the second heat treatment, but normally 20° C./minute or less, or particularly no less than 1° C./minute and no more than 20° C./minute, or more particularly no less than 4° C./minute and no more than 10° C./minute is desirable.

The time taken for heat treatment in the present invention can be any time adequate for the polymer film to change to graphite, and can be set appropriately according to the heat treatment temperature or the like. In general it can be within the range of no less than 10 minutes and no more than 3 hours.

There are no particular limits on the heat treatment atmosphere, which may be either a reduction atmosphere, an inactive gas atmosphere, a vacuum or the like. An inactive gas atmosphere is particularly desirable. The inactive gas may be for example argon, helium, nitrogen or the like. In particular, argon can be used by preference.

The electron-emitting material obtained in this way is composed of oriented graphite comprising a second component and having pores in the inside. Specifically, an emissive material can be obtained having the structure shown in 2. below.

2. Electron-Emitting Material

The electron-emitting material of the present invention is an electron-emitting material consisting of oriented graphite, wherein the electron-emitting material 1) comprises a second component other than carbon and has pores inside and 2) has a density of no less than 0.60 g/cm³ and no more than 2.00 g/cm³.

As opposed to the density of 2.26 g/cm³ of single crystal graphite, the density of the electron-emitting material of the present invention is no less than 0.60 g/cm³ and no more than 2.00 g/cm³ (preferably no less than 0.8 g/cm³ and no more than 1.5 g/cm³). If the density is too high it is impossible to maintain the specific strength as an emissive material, while if the density is too low the desired electron emission characteristics cannot be obtained.

The electron-emitting material of the present invention comprises a second component. In other words, a second component is present in the oriented graphite. The second component used may be the one shown in 1. above.

The contained amount of the second component can be set appropriately depending on the desired electron emission characteristics, the type of second component and the like but may normally be no less than 10 ppm by weight and no more than 10% by weight or especially no less than 100 ppm by weight and no more than 2% by weight of the oriented graphite.

In the present invention "oriented graphite" signifies not a perfect graphite structure of parallel layered graphenes having a hexagonal carbon structure, but a layered body in which graphene bodies (layered bodies) consisting of multiple layers of flat graphenes having a hexagonal carbon structure appear in cross-section to be stacked in a wavy pattern. In the oriented graphite of the present invention there are pores between the stacked graphene bodies. In other words, the oriented graphite of the present invention is characterized in that the distance between two stacked graphene bodies (distance between layers) is not fixed.

In this way, excellent electron emission characteristics can be achieved by interspersing pores and a second element between layers and layering each layer (each graphene) in a wavy pattern to improve the surface condition of the graphite.

In the present invention the crystallite size in the C-axial direction in the oriented graphite is preferably 10 nm or more (corresponding to about 30 or more layers at 0.354 nm per layer). If the crystallite size is less than 10 nm a structure formed by layering of flat structures (graphene structures) having a hexagonal carbon structure will be fragmentary, so that the desired function of the graphite as a pore may not be achieved.

There are no limits on the size and distributed amount of the pores, which can be determined according to the desired electron emission characteristics and the like. The size of the pores can normally be no less than 10 nm and no more than 10 μm. The distributed amount of the pores can be adjusted so that the density of the oriented graphite is no less than 0.60 g/cm³ and no more than 2.00 g/cm³.

3. Electron-Emitting Element

The present invention encompasses an electron-emitting element having at least an electron-emitting layer, a control electrode layer and an insulating layer on a substrate, the electron-emitting layer and the control electrode layer being arranged with the insulating layer therebetween, wherein the electron-emitting layer is the electron-emitting material of the present invention.

Apart from the use of the emissive material of 2. above as the emissive layer, elements (spacers and the like) which are employed in known emissive elements can be applied to the emissive element of the present invention.

The base can be chosen from known materials. For example, insulating materials such as glass, quartz, ceramics ($Al_2O_3$, $ZrO_2$ and other oxide ceramics, $Si_3N_4$, BN and other non-oxide ceramics) and the like and conductive materials such as low-resistance silicon, metals, alloys, intermetallic compounds and the like can be used. The thickness of the base is not limited, and can normally be between about 0.5 mm and 2 mm.

The electron-emitting material of the present invention is used for the electron-emitting layer. It is sufficient that electrons be emitted at least in the electrical field. One or two or more kinds of emissive material can be used. An emissive material other than a material of the present invention (such as silicon, a metal material or the like) can also be contained.

Components other than emissive materials can also be contained to the extent that they do no interfere with the effects of the present invention. The material of the present invention is preferably contained in the emissive layer in the amount of 20% or more by volume (especially no less than 50% and no more than 100% by volume).

The thickness of the electron-emitting layer differs depending on the type of emissive material used and the like, but can generally be from about 0.5 μm to about 20 μm.

The material of the present invention is exposed on the surface of the emissive layer. When the electron-emitting layer is entirely composed of the material of the present invention (emissive material), that is, when the electron-emitting layer consists of the material of the present invention (emissive material), the material of the present invention (emissive material) is naturally exposed on the surface of the electron-emitting layer. On the other hand, when part of the emissive layer comprises the material of the present invention (emissive material, part or all of the aforementioned material of the present invention (emissive material) is exposed on the surface of the emissive layer. This electron-emitting layer is also conductive as exemplified by the fact that it consists of carbon.

The electron-emitting material obtained in 1. above can be used as is as the electron-emitting layer. The electron-emitting layer can also be obtained by baking a film of paste comprising the electron-emitting material in powdered form. For example, a paste prepared by mixing of a powdered emissive material with a mean particle size of from about 0.5 μm to about 10 μm mixed with an organic binder (such as isopropyl methacrylate) can be applied to an lower electrode layer, and the resulting film baked and the organic binder removed to favorably obtain the specified emissive layer. The desired electron emission characteristics can also be achieved with such an emissive layer.

In the present invention, it is desirable to have an lower electrode layer between the substrate and the electron-emitting layer. There are no particular limits on the lower electrode layer as long as it is a material capable of supplying electrons to the electron-emitting layer. For example, a metal material such as aluminum, titanium, chromium, nickel, copper, gold, tungsten or the like, or a composite material of a metal layered with a low-resistance n-type semiconductor such as silicon, gallium nitride or the like can be used. The thickness of the lower electrode layer can normally be from about 1 μm to about 50 μm.

The control electrode layer serves the function of providing an electrical field for the emissive layer when voltage is applied and controlling the amount of emitted electrodes according to the strength of that electrical field. The material thereof is not limited as long as it has such a function. In particular, a metal with good working properties such as patterning, adhesiveness with the adjoining layers and the like can be used favorably. In general, aluminum, nickel or the like can be used favorably. The thickness of the control electrode layer can normally be from about 0.1 μm to about 3 μm.

The element of the present invention can be configured in any way as long as the electron-emitting layer and the control electrode layer do not contact one another. The electron-emitting layer and control electrode layer may have at least one of air and an insulating body therebetween. For example, the emissive layer on its substrate may be opposed to the control electrode layer with air in between. Specifically, the arrangement of gate electrode and emitter in a known spint-type electron-emitting device can be employed. The aforementioned space is preferably a vacuum or near-vacuum. The distance between the two layers can be determined appropriately according to the desired properties, the strength of the electrical field and the like. In general, the shorter the aforementioned distance, the less voltage is required. Moreover, it is desirable that the emissive layer and control electrode layer be effectively parallel to one another.

Figure 6:
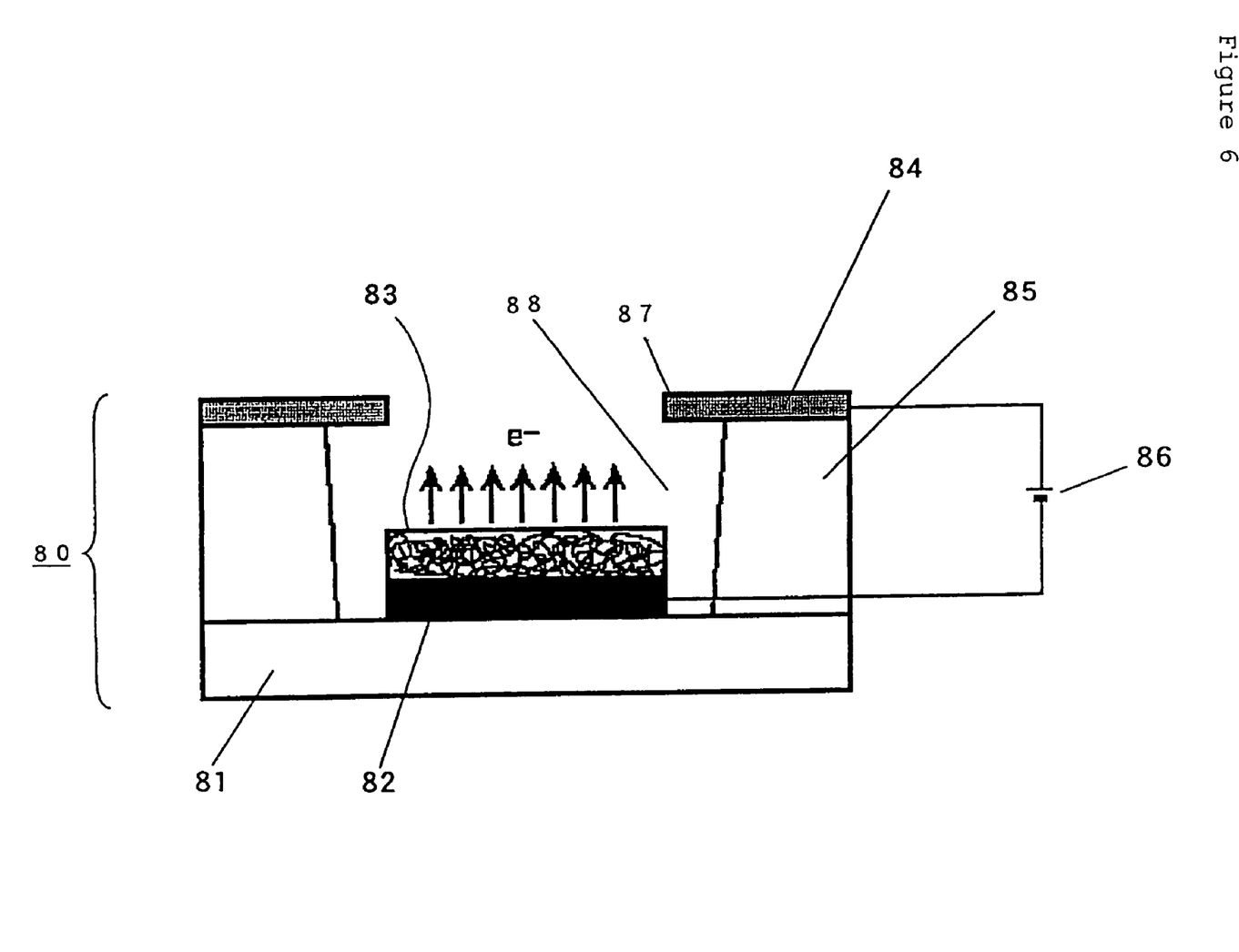
FIG. 6 is a schematic view (cross-section) showing one example of the electron-emitting element of the present invention.

That "the electron-emitting layer and the control electrode layer do not contact one another" signifies that, as shown in FIG. 6 and described below, the emissive layer and control electrode layer are separated and insulation is maintained therebetween.

The electron-emitting layer and control electrode layer may both be fixed with a spacer (insulator) therebetween. An alumina, zirconia, silicon dioxide or other insulating material can be used favorably as the spacer.

Known thin-film manufacturing technology or semiconductor manufacturing technology can be used in the method for manufacturing the element of the present invention. Thin-film manufacturing technology which can be used favorably includes for example sputtering, vacuum deposition, electron beam deposition, chemical vapor deposition (CVD) and the like.

In particular, there are no limits on the method of forming the emissive layer as long as it can be fixed on an lower electrode layer on top of a substrate. For example, methods than can be used include 1) a method of binding an electron-emitting material by means of a conductive adhesive to an lower electrode layer on top of a substrate, 2) a method of coating or printing a mixture obtained by mixing an organic binder with powder obtained by pulverizing an emissive material (paste containing emissive material) on an lower electrode layer, and 3) a method of forming an electron-emitting material on an lower electrode layer and using it is as is as the electron-emitting layer. The aforementioned conductive adhesives, organic binders and the like may be known or commercial ones.

The electron-emitting element of the present invention can be driven in the same way as known emissive elements. For example, a set voltage can be applied to the control electrode layer and the lower electrode layer on top of the substrate. The voltage can be adjusted so as to obtain an electrical field with a field strength of $1 \times 10^6$ V/m or more. In this case, the drive atmosphere may normally be a vacuum or near-vacuum. The drive temperature is not limited but may be set to normally between about 0° C. and 60° C. The current may be either direct current or pulse current (rectangular waves).

The electron-emitting element of the present invention is shown schematically (in cross-section) in FIG. 6. Electron-emitting element 80 has, as basic constituent elements, substrate 81, electrode layer (lower electrode layer) 82, electron-emitting layer 83 which emits electrons, insulator layer 85, and control electrode layer 84 which applies the voltage (control source 86) for electron emission. Electron-emitting layer 83 consists of the electron-emitting material explained in each embodiment, or of a composite material containing same.

Electrode layer 82 and electron-emitting layer 83 are formed on substrate 81, and control electrode layer 84 is placed nearby with insulating layer 85 in between. In FIG. 6, control electrode layer 84 is formed in the same way as the gate electrode of a conventional spint-type electron-emitting device to surround the upper edge of electron-emitting layer 83, but another mode is permissible.

In control electrode layer 84, which is formed on insulating layer 85, part of the control electrode layer consists of "protruding portion 87," which protrudes from insulating layer 85. Formation of the protruding portion is not essential, and can be done appropriately as necessary. In FIG. 6, region 88 between this protruding portion and the emissive layer is a space, but this can also be filled with an insulator.

In general a glass substrate or quartz substrate is used favorably for substrate 81. Also, as mentioned above, a low-resistance silicon substrate, metal substrate or other conductive base can also be used. When a conductive base is used, the conductive base can be made to have the functions of electrode layer 82.

In addition to metal materials such as aluminum, titanium, chromium, nickel, copper, gold, tungsten and the like, a structure consisting of a layers of metal and a low-resistance n-type semiconductor such as silicon or gallium nitride is desirable as electrode layer 82. A structure of the aforementioned electrode layer laminated with resistant film can also be used as electrode layer 82 for purposes of stabilizing the emission current. The thickness of electrode layer 82 may generally be from about 1 μm to about 50 μm.

A porous body having an emissive component as its skeleton is can be used for electron-emitting layer 83. A typical example of such a structure is a porous body with a pore size of a few tens of nm. Moreover, electron-emitting layer 83 has the function of emitting electrons into vacuum in response to an electrical field produced by the application of voltage to control electrode layer 84. This material can be selected appropriately from those described above.

Control electrode layer 84 supplies an electrical field to electron-emitting layer 83 when voltage is applied, and functions to control the amount of electrons emitted according to the strength of that field. It is formed on top of insulating layer 85. Voltage is applied to control electrode 84, which is connected to the positive pole of power source 86, and electrode layer 82, which is connected to the negative pole of power source 86.

In FIG. 6, electron-emitting layer 83 is connected to control electrode layer 84 via insulating layer 85, but insulating layer 85 may be omitted as long as emissive layer 83 does not contact control electrode layer 84.

In emissive element 80, since the material of the present invention is applied to emissive layer 83, a more efficient field concentration effect can be obtained than in the past. As a result, the applied voltage can be lower than in the past.

ADVANTAGES OF THE INVENTION

Thus, with the present invention it is possible to manufacture, by heat treatment of a polymer film in the presence of a metal element, an oriented graphite which comprises a metal element and includes pore regions. In this way, the foaming condition can be greatly altered because a catalytic effect can be anticipated in the process of carbonization and graphitization by heat treatment. That is, foaming occurs inside the graphite, and each graphene body of the layered graphite structure bends gently (curves gently), allowing the desired pore regions to be formed within the graphite. Moreover, by forming pores within the graphite and forming a rugged structure on the graphite surface, it is possible to obtain a high-quality, flexible and extremely tough graphite with excellent conductivity. Moreover, by including a second component it is possible to contribute to improving the electron emission characteristics by changing the surface condition.

INDUSTRIAL APPLICABILITY

The emissive material of the present invention can provide a better emissive element than conventional elements because superior electron emission characteristics are achieved due to the presence of pores and a second element. Consequently, it can be used effectively in a variety of electronic devices. For example, it can be used favorably in fluorescent luminous elements, picture display devices (especially field emission displays) and the like. In the case of picture display devices it is also useful in the manufacture of large image displays.

EXAMPLES

The present invention is explained in more detail below using examples. However, the present invention is not limited by the examples.

Example 1

Toray-Dupont polyimide film (product name Kapton™) 100 mm×100 mm×25 μm thick was used as a starting polymer. 1 g of Fe powder with a particle size of 10 μm was sprinkled on the surface of the polyimide film to arrange the Fe powder on the surface of the polyimide film, which was then placed in an electric furnace and heat treated. After being heated in an argon gas atmosphere from room temperature to 1200° C. at a heating rate of 3° C./min, this was maintained for 3 hours at 1200° C. (pre-baking step).

Nitrogen gas or another inactive gas is also possible as the baking atmosphere, and a mixed gas of argon and nitrogen can also be used. Moreover, the size of the metal particles is not limited to 10 μm, and Fe powder with a particle size of 1 μm and 50 μm may be used. In addition, the metal element is not limited to Fe, and Ni, Co, Pd, Ir, Pt or the like could be used. The temperature for introducing the metal element can be in the range of no less than 600° C. and no more than 900° C. The heating rate for heating and reaction is not limited to 3° C./minute, and any rate of 10° C./minute or less is possible.

Following the pre-baking step, the temperature was lowered to room temperature. In this example 1, the cooling rate was 5° C./minute. The cooling rate does not need to be controlled precisely, but is generally 10° C./minute or less.

In this pre-baking step, the thermal decomposition of the starting raw material removed nitrogen, oxygen and hydrogen so that the weight percentage decreased to 50%-60% of the starting raw material, producing a graphite precursor. By introducing a metal element while this thermal decomposition reaction is underway it is possible to not only promote graphitization by including it with the carbon in this baking step but also to form pores inside the graphite.

And then, the sample from the pre-baking step was transferred to an ultra-high-temperature furnace for the main baking step. In this Example 1, the heating rate up to 1200° C. was 5° C./minute, after which the heating rate was 3° C./minute up to the main baking temperature of 2800° C., which was maintained for 2 hours.

The main baking temperature was maintained and then cooled. The cooling rate was 10° C./min from 2800° C. to 2200° C., and 20° C./min from 2200° C. to room temperature. The aforementioned cooling rate is not limited to 10° C./min, and can be chosen within the range of no less than 1° C./min and no more than 20° C./min.

Figure 1:
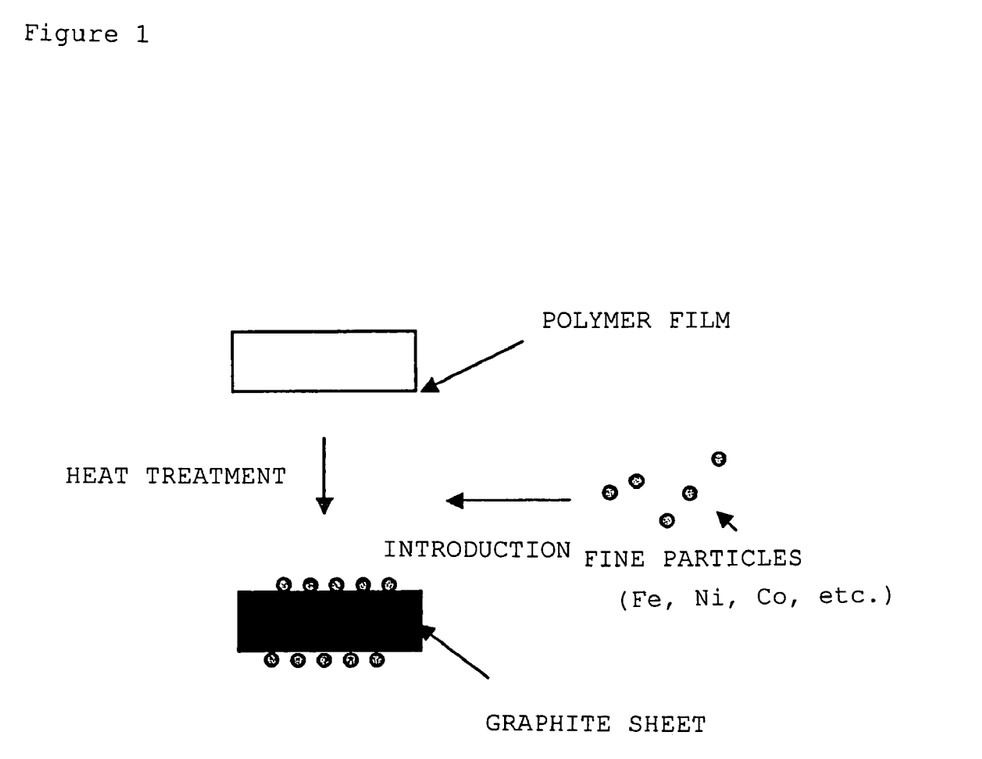
FIG. 1 shows a manufacturing method wherein a graphite sheet is prepared by introduction of a metal element in the heat treatment step.
Figure 2:
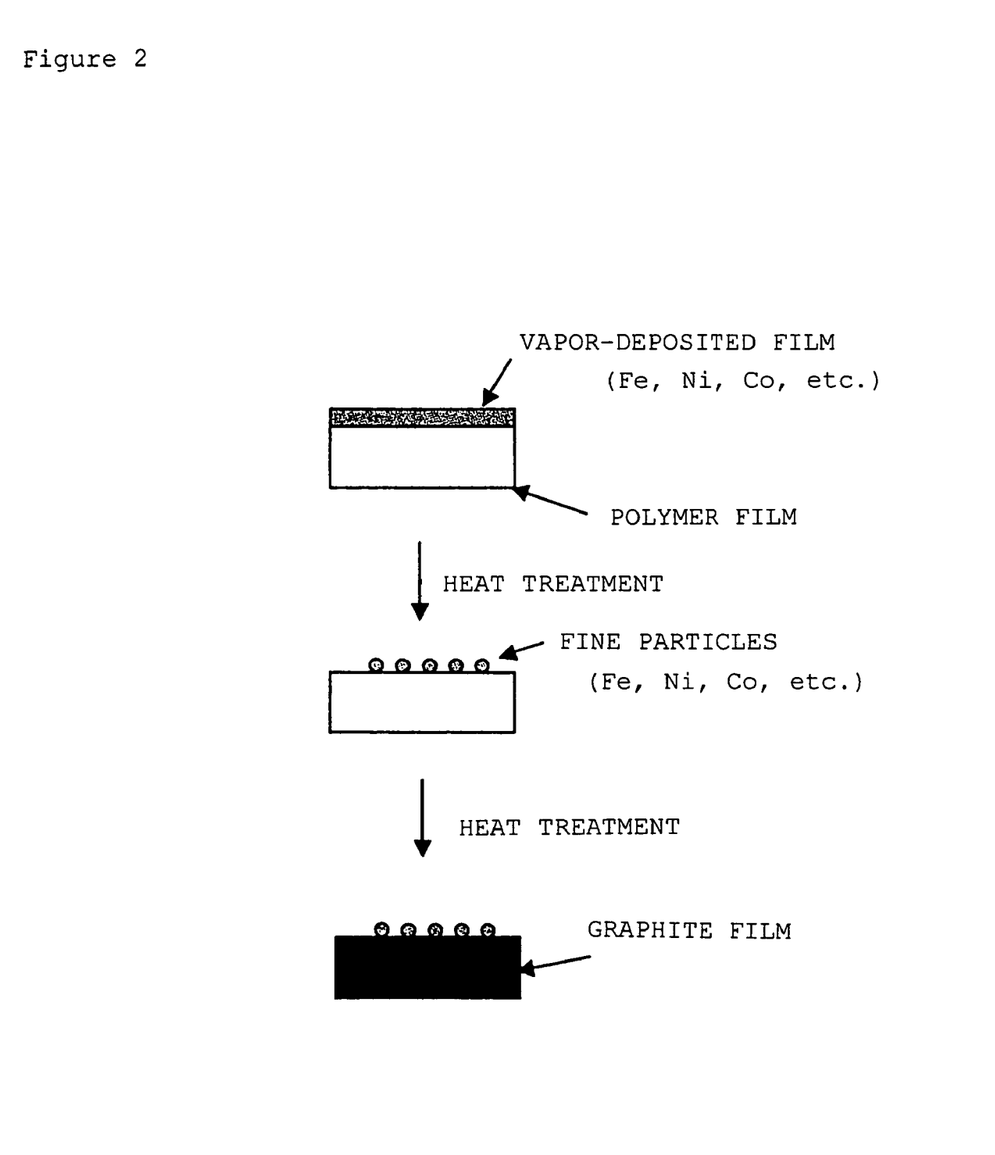
FIG. 2 shows a method for manufacturing a graphite sheet by vapor depositing a metal on a polymer film and then heat treating it in advance to form fine metal particles.
Figure 3:
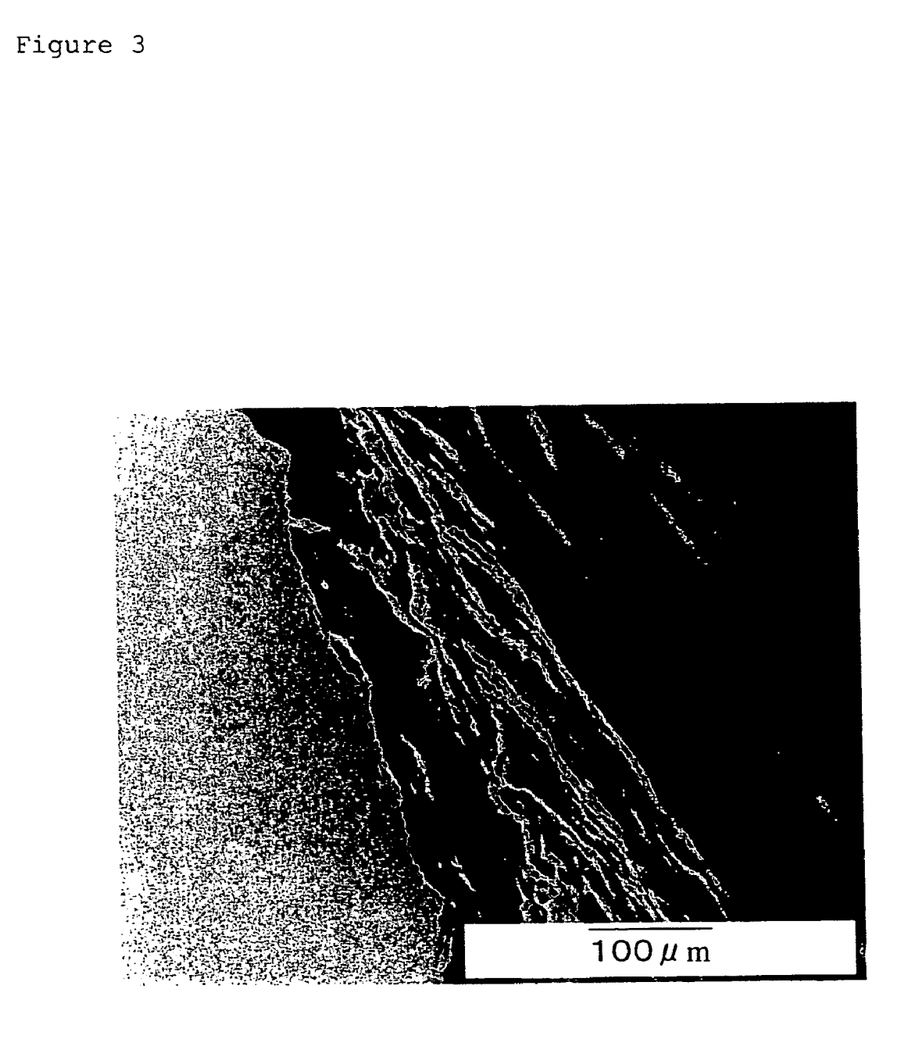
FIG. 3 is an image showing the results of electron microscopic observation of a cross-section of oriented graphite comprising and having pores.

The thickness of the resulting graphite sheet was about 60 μm. A cross-section of the graphite sheet was observed by scanning electron microscopy (SEM). As shown in FIG. 3, the results show a structure of layered graphenes which are bent in wave form. The inside of the graphite sheet contains numerous pores, with a size of 50 nm to 500 nm. Spectroscopic (ICP) analysis revealed that the concentration of metal in the sheet was 0.1% by weight.

When the diffraction peak of the graphite obtained in x-ray diffraction was evaluated, analysis of the half-value width of the rocking curve of the peak showed that a crystallite size in the c-axial direction was 10 nm or more. In SEM observation, the thickness of each layered surface of graphite was 1 μm or less, while the size of a linear layered surface with no curvature in the direction of the layered surface was 10 μm or less.

The measured density of the graphite sheet was 1.0 g/cm$^3$, in contrast to the density of 2.26 g/cm$^3$ of single crystal graphite, reflecting the inclusion of pore regions inside the graphite.

Figure 4:
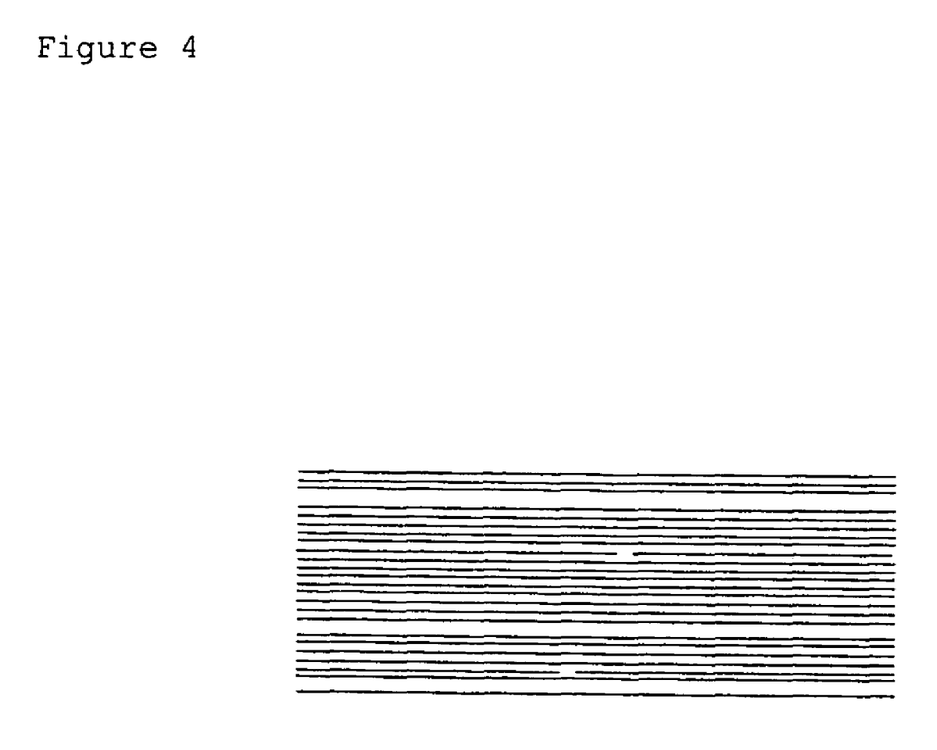
FIG. 4 is a typical view showing the layered structure of graphite having no pores on the inside.
Figure 5:
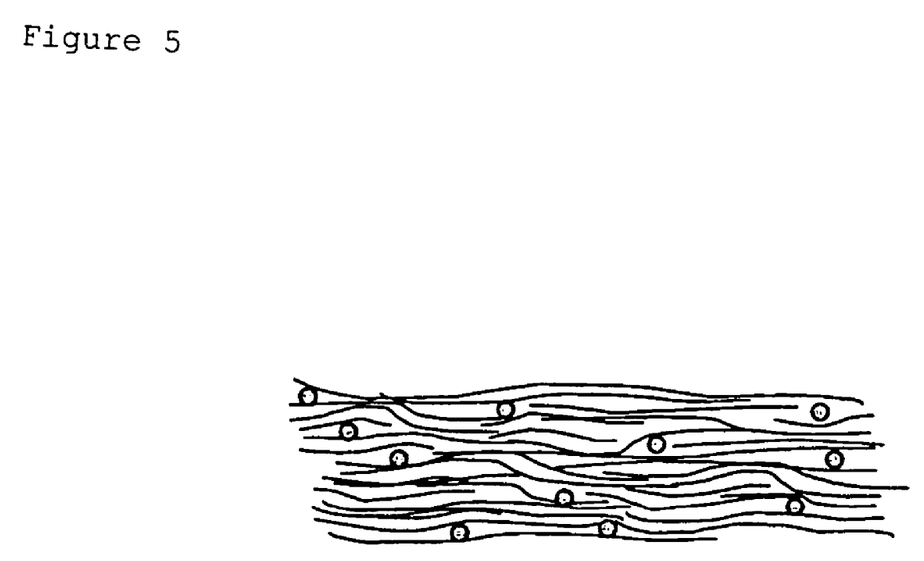
FIG. 5 is a typical view showing the layered structure of oriented graphite having pores and comprising metal elements in the inside.

A model of the structure of a graphite sheet obtained in this way is shown. As shown in FIG. 4, a graphite sheet which undergoes no foaming and lacks pore regions has a layered graphite structure across the entire sheet, but since the entire sheet is not single crystal, some of the layered graphite surfaces split, opening a larger distance between layers. On the other hand, a model of a graphite sheet formed as in Example 1 is shown in FIG. 5. As shown in FIG. 5, the layered graphite surfaces of this sheet are bent across the entire sheet, and the inside of the sheet contains pore regions 10 nm to 10 μm in size within which are metal elements.

The electron emission characteristics of the resulting graphite sheet (sheet of the present invention) were evaluated. The graphite sheet was fixed on an electrode jig, voltage was applied in a vacuum unit between the graphite sheet as the negative electrode and a counter electrode, and the field emission characteristics were measured. The field emission characteristics of the graphite sheet were emission current of 6×10$^{-4}$ A/cm$^2$ at a field strength of 3 kV/mm.

The same measurements were performed with respect to a graphite sheet (comparison sheet) manufactured in the same way as in Example 1 except that the second component was not added. In the results, the emission current of the comparison sheet was 5×10$^{-5}$ A/cm$^2$. These results confirmed that the sheet of the present invention emits more electrons.

Moreover, in order to evaluate the heat conduction characteristics of the sheet of the present invention, the sheet of the present invention was sandwiched between a heat source and a heat sink, and the heat difference between the heat source and the heat sink was measured. A sheet of the present invention 2 cm×1.5 cm in size was fixed between a heat sink and a heat source 2 cm×1.5 cm in size. Fixing was accomplished with an M3 vis and a screw torque of 1 MPa. 4W of electric power was supplied to heat the heat source, the temperature difference between the heat source and heat sink was measured when a steady state was reached, and heat resistance was calculated. As a result, the sheet of the present invention exhibited heat resistance of 0.22° C./W, less than the heat resistance of 0.40° C./W for the comparison sheet. This was attributed to better heat contact due to the presence of metal elements and pore regions, and confirmed that this was a good heat-conductive material.

Although the starting raw material used in this Example 1 was polyimide, it was confirmed that graphitization was possible in a manufacturing method similar to that described above using a polymer film other than polyimide. Specifically, oriented graphite comprising a metal element and having pore regions in the inside was also obtained with other polymer films including polyphenylene terephthalamide (PPTA), polyphenylene oxadiazole (POD), polybenzothiazole (PBT), polybenzobisthiazole (PBBO), polyphenylene benzimidazole (PBI), polyphenylene benzobisimidazole (PPBI), polythiazole (PT) and polyparaphenylenevinylene (PPV).

Example 2

In Example 2, Toray-Dupont Kapton (size 100 mm×100 mm×25 μm thick) polyimide film was used as the starting material and heat treated using the same temperature program as in Example 1. The pre-baked sample was transferred to an ultrahigh heat furnace, and 1 g of Fe powder with a particle size of 10 μm was sprinkled on the surface of the polyimide film to arrange Fe powder on the surface of the polyimide film. This was next placed in an ultrahigh heat furnace and heat treated. Main baking was according to the same temperature program as in Example 1. The metal element is not limited to Fe, and Ni, Co, Pd, Ir, Pt or the like can be used.

The resulting graphite sheet had a thickness of about 50 μm and numerous pore regions on the inside, and the metal element was confirmed within the sheet. The diffraction peak of the graphite obtained by x-ray diffraction was also evaluated. The results showed that a crystallite size in the c-axial direction was 10 nm or more, and density was measured at 1.6 g/cm$^3$. Observation in cross-section confirmed a graphite structure consisting of layers of gently bent graphenes.

Example 3

In Example 3, heat treatment was performed according to the same temperature program (baking schedule) as in Example 1 but the metal element was not introduced in the pre-baking step. The pre-baked sample was transferred to an ultrahigh heat furnace, and main baking was carried out according to the same temperature program as in Example 1. At a temperature of 2000° C. in the main baking step, 1 g of calcium hydrogenphosphate having a particle size of 5 μm was vaporized by heating to 1800° C., introduced in mixture with the argon gas and reacted.

The resulting graphite sheet was about 50 μm thick. Numerous pore regions were present inside the graphite sheet, and Ca and P were confirmed inside the sheet. An evaluation of the diffraction peak of the graphite obtained by x-ray diffraction showed that a crystallite size in the c-axial direction was 10 nm or more. Observation in cross-section confirmed a layered graphite structure consisting of layers of gently bent graphenes.

Reference Example 1

In Reference example 1, baking was performed under the same conditions as in Example 1 using polyimide fiber (Toray-Dupont product name: Kevlar) with a diameter of about 15 μm as the starting material.

The resulting graphite was particulate with a particle size of 100 to 200 μm, with numerous pore regions on the inside, and metal elements were confirmed on the inside. An evaluation of the diffraction peak of the graphite obtained by x-ray diffraction showed a crystallite size in the c-axial direction of 10 nm or more, and it was possible to confirm that it had a layered graphite structure consisting of layers of graphene structures.

The hydrogen absorption and desorption characteristics of the resulting graphite powder were compared to those of a graphite powder which contained no metal elements and which was insufficiently foamed. The hydrogen absorption of the oriented graphite powder containing metal elements obtained in Reference example 1 was 0.24% at room temperature and 12 MPa, compared to 0.05% for conventional graphite powder, so high hydrogen absorption was confirmed.

Moreover, the characteristics of the resulting graphite powder used as the anode material of a secondary lithium battery were compared to those of conventional graphite powder. In the case of an anode made with the graphite powder obtained in Reference example 1, the initial discharge capacity was 320 mAhg$^{-1}$, while discharge capacity after 100 repeated charges and discharges was 250 mAhg$^{-1}$. In contrast, the initial discharge capacity of the conventional graphite powder was 280 mAhg$^{-1}$, and the discharge capacity after 100 repeated charges and discharges was 120 mAhg$^{-1}$. This confirmed that in terms of performance, an oriented graphite powder comprising catalytic elements has greater capacity than a conventional graphite powder when used as the anode of a secondary lithium battery powder.

Reference Example 2

In Reference example 2, an experiment was performed using as the starting raw material Toray-Dupont Kevlar 15 μm in diameter which had been made into woven fabric as a woven fabric of amide fiber. Making the starting raw material into a woven fabric allows not only for easier handling but also for improvement of the raw material filling factor.

The pre-baking and main baking steps were performed as in reference example 1 to powder-graphitize the amide fabric, resulting in an oriented graphite powder containing pore regions and comprising metal elements with a roughly uniform particle size as in Reference example 1.

Reference Example 3

In Reference example 3, an Ube Industries polyimide porous film of a polyimide porous body was used as the starting raw material. The size of the pore regions can be controlled by controlling the pore size of the porous film.

The pre-baking and main baking steps were performed as in Reference example 1 to graphitize the polyimide film, thus breaking down the porous structure to obtain an oriented graphite powder containing pore regions and comprising metal elements with a roughly uniform particle size as in Reference example 1.

Reference Example 4

In Reference example 4 an experiment was performed using Ube Industries polyimide powder (product names UP-R and UP-S) as the starting raw material. "UP-R" is poly(N,N'-oxyniphenylene biphenyltetracarboxylmide), and "UP-S" is poly(N,N'-P-phenylene biphenyltetracarboxylmide).

The pre-baking and main baking steps were performed as in Reference example 1 to graphitize the polyimide foam and obtain an oriented graphite powder containing pore regions and comprising metal elements with a roughly uniform particle size as in Reference example 1 from both UP-R and UP-S.

The invention claimed is:

1. A method for manufacturing an electron-emitting material consisting of oriented graphite, the oriented graphite having a sheet form and emitting an electron from an upper surface, the method comprising a step of heat-treating a polymer film with a particulate component, which serves as a second component other than carbon and is arranged on the upper surface of the polymer film, for forming the polymer film to obtain an oriented graphite with a density of no less than 0.60 g/cm$^3$ and no more than 2.00 g/cm$^3$ which comprises the second component and has pores inside.

2. The manufacturing method according to claim 1, wherein the second component is arranged on the upper surface of the polymer film by sprinkling the second component in the solid state on the upper surface.

3. The manufacturing method according to claim 1, wherein the second component is arranged on the upper surface of the polymer film by coating the upper surface of the polymer film with a solution or dispersion of the second component.

4. The manufacturing method according to claim 1, wherein all or part of the second component is introduced during heat treatment.

5. The manufacturing method according to claim 1, wherein the thickness of the polymer film is no less than 10 μm and no more than 200 μm.

6. The manufacturing method according to claim 1, wherein the polymer film is at least one of polyamide, polyimide, polyphenylene terephthalamide, polyphenylene oxadiazole, polybenzothiazole, polybenzobisthiazole, polyphenylene benzoimidazole, polyphenylene benzobisimidazole, polythiazole, polyparaphenylenevinylene, polyamidimide and polyacrylonitrile.

7. The manufacturing method according to claim 1, wherein heat treatment is performed in the temperature range of no less than 400° C. and no more than 3200° C.

8. The manufacturing method according to claim 1, wherein heat treatment comprises a first heat treatment performed in the temperature range of 400° C. or more and less than 1400° C., and a second heat treatment performed in the temperature range of no less than 1400° C., and no more than 3200° C. after the first heat treatment.

9. The manufacturing method according to claim 8, wherein the second component is arranged on the upper surface of the polymer film between the first heat treatment and the second heat treatment.

10. The manufacturing method according to claim 8, wherein the first heat treatment is followed by cooling to 30° C. or less, and followed by the second heat treatment.

11. The manufacturing method according to claim 10, wherein the cooling rate after the first heat treatment and/or the cooling rate after the second heat treatment is 10° C./minute or less.

12. The manufacturing method according to claim 8, wherein the heating rate in the first heat treatment and/or second heat treatment is 10° C./minute or less.

13. The manufacturing method according to claim 1, wherein the second component is 10 ppm or more by weight and 10% or less by weight of the resulting oriented graphite.

14. The manufacturing method according to claim 1, wherein the second component is at least one metal element.

15. The manufacturing method according to claim 1, wherein the second component is at least one selected from the group consisting of Ni, Cr, Fe, Pd, Ir, Pt, P, Ca, Si, Al and Mg.

16. The manufacturing method according to claim 1, wherein the mean particle size of the particulate component is no less than 1 u and no more than 50 μm.

17. The manufacturing method according to claim 1, wherein the oriented graphite consists of a layered body formed by layering of graphenes having a hexagonal carbon structure so as to appear to be stacked in a wavy pattern.

18. The manufacturing method according to claim 1, wherein the crystallite size in the c-axial direction in the oriented graphite is 10 nm or more.

19. The manufacturing method according to claim 1, wherein the pore size in the oriented graphite is no less than 10 nm and no more than 10 μm.

* * * * *

UNITED STATES PATENT AND TRADEMARK OFFICE
CERTIFICATE OF CORRECTION

PATENT NO. : 7,351,443 B2 Page 1 of 1
APPLICATION NO. : 11/134327
DATED : April 1, 2008
INVENTOR(S) : Akira Taomoto et al.

It is certified that error appears in the above-identified patent and that said Letters Patent is hereby corrected as shown below:

In Column 5, line 48, change "a liquid staye," to --a liquid state,--; and

In Column 16, line 35 (Claim 16), change "is no less than 1 u" to --is no less than 1 μm--.

Signed and Sealed this

Seventeenth Day of February, 2009

JOHN DOLL
*Acting Director of the United States Patent and Trademark Office*